United States Patent [19]

Hotta et al.

[11] 4,326,274

[45] Apr. 20, 1982

[54] TRANSMISSION SYSTEM OF AERIAL ULTRASONIC PULSE AND ULTRASONIC TRANSMITTER AND RECEIVER USED IN THE SYSTEM

[75] Inventors: Mitsuhiko Hotta, Kyoto; Shuhei Furuichi, Shiga; Takanori Shigihara, Hyogo, all of Japan

[73] Assignee: Kabushiki Kaisha Morita Seisakusho, Kyoto, Japan

[21] Appl. No.: 165,385

[22] Filed: Jul. 3, 1980

[30] Foreign Application Priority Data

Jul. 4, 1979 [JP] Japan .................................. 54/85318

[51] Int. Cl.³ ............................................. H04R 17/00
[52] U.S. Cl. .................................... 367/118; 310/326; 367/140; 367/162

[58] Field of Search ............... 367/138, 140, 162, 176, 367/118, 119; 310/326, 327

[56] References Cited

U.S. PATENT DOCUMENTS 3,427,481 2/1969 Lenahan et al. ..................... 310/327

Primary Examiner—Richard A. Farley
Attorney, Agent, or Firm—Koda and Androlia

[57] ABSTRACT

The disclosure relates to a system for aerially transmitting an ultrasonic view of a vibration mode, small in angle of direction, in a clear state and to a transmitter and a receiver used in the system. According to the system, an ultrasonic pulse can be used for distance measurement, control and other signal means even at relatively short distance.

4 Claims, 10 Drawing Figures

TRANSMISSION SYSTEM OF AERIAL ULTRASONIC PULSE AND ULTRASONIC TRANSMITTER AND RECEIVER USED IN THE SYSTEM

BACKGROUND OF THE INVENTION

1. Field of the Invention

This invention relates to a system for aerially transmitting an ultrasonic pulse, and more particularly to a system of aerially transmitting an ultrasonic wave having a thickness ultrasonic mode, narrow in angle of direction, in a clear state (noiseless state) and to a transmitter and receiver used in the system.

2. Prior Art

Conventionally, a system of transmitting an ultrasonic pulse by a transmitter and receiving the ultrasonic pulse propagated through the air by a receiver, detecting the pulse and obtaining an electrical signal corresponding to the envelope curve of the ultrasonic pulse has been employed as a system for aerially transmitting an ultrasonic pulse. In order to hold the ultrasonic pulse to be transmitted accurate with respect to time in industrial application of the system, it is necessary to obtain an optimum value of mechanical Q inherent in the transmitter and receiver; but it was difficult to manufacture the transmitter and the receiver by the prior art without reducing the mechanical Q. As a result, the ultrasonic pulse generated by the conventional transmitter produces complicated vibrations with accompanying long after-vibrations as shown in FIG. 2A and consequently, it is very difficult for the receiver to receive the pulse and to cause it to be driven in terms of an electrical means from the receiver while holding the pulse accurate with respect to time.

Namely, FIG. 2A is an explanatory view schematically showing the ultrasonic pulse which the piezoelectric element of the conventional ultrasonic transmitter generates by one driving pulse. In the figure when a driving pulse is applied to the conventional transmitter through a pulse transformer, the element is heavily excited by a piezoelectric effect, and emits an ultrasonic wave of a specified frequency (fo) in the air because of resonance characteristic of the piezoelectric element. The ultrasonic wave emitted in this manner produces heavy vibrations when a driving pulse is applied to the piezoelectric element, and even after the driving pulse disappears, not only after-vibrations continue for a long time when the mechanical Q is unnecessarily high, but also vibrations at the end face of the thickness piezoelectric element spread through the casing slightly later than the vibrations at the front end face and come over to the front end face, creating reverberation and echo thereon and interfering in the spread of the pulse. Accordingly, it is considered difficult in practical use to send out an ultrasonic pulse corresponding to the driving pulse with excellent damping characteristics. But when consideration is given to advantages obtainable both from the characteristics of the ultrasonic pulse far lower in propagation rate than light, electric wave, laser, etc. and from superiority of the pulse in directivity to an ordinary sound wave, the use of the ultrasonic pulse as a short distance signal transmission means in the air not only provides highly accurate measurement and control, but also finds very useful application to all other fields of industry. Also, although it is known that the characteristics of an ultrasonic wave makes it possible for the ultrasonic wave to be reduced in angle of direction by a small ultrasonic piezoelectric element; if it is possible to derive an ultrasonic pulse narrow in angle of direction from a thickness piezoelectric element without sacrificing such characteristics of the ultrasonic wave, it is not only possible to make useful application of the characteristics of the ultrasonic pulse, but also possible to make such aerial transmission of an ultrasonic pulse between movable bodies lying adjacent to obstacles, as has heretofore been considered impossible. It is needless to explain that the usefulness and increased application of such aerial transmission will be limitless.

This invention has been worked out after careful study of the above-described disadvantages inherent in the prior art of aerial ultrasonic transmission systems. The invention has made it possible to provide industrial applications of an ultrasonic pulse which corresponds to a signal pulse for driving a piezoelectric element which is excellent in damping characteristic, and has further enabled aerial transmission of the ultrasonic pulse. Namely, the invention has made it possible to aerially transmit an ultrasonic pulse by disposing the ultrasonic transmitter and receiver, matched and the same in structure, which are provided by the invention and which will become apparent from a description that follows, in an opposed relation with each other on a straight line as shown in FIG. 1, applying a driving pulse to a piezoelectric element in a transmitter having a suitable Q, vibrating the piezoelectric element in one cycle with increased amplitude as shown in FIG. 2B. As a result the driving pulse applied to the piezoelectric element is brought into corresponding relation with the vibration of the ultrasonic pulse generated by the driving pulse at a ratio of substantially 1:1 by reducing the time constant of an envelope curve of the subsequent damped oscillation of the piezoelectric element 1 and emitting the ultrasonic pulse by the transmitter S and receiving the pulse by the receiver R, thereafter converting the pulse into an electric signal. The area of transmission in which the ultrasonic pulse is transmitted on the aerial transmission system of an ultrasonic pulse, according to the invention, can be made very small like the area of space shown by X in FIG. 1, which fills two areas of space, one being the area of space in which the transmitter S emits an ultrasonic pulse small in angle of direction and the other being the area of space in which the receiver R having the same structure as the transmitter S, disposed in an opposed relation with the transmitter S, can sense the ultrasonic pulses emitted.

SUMMARY OF THE INVENTION

Accordingly, the primary object of this invention is to provide a transmission system for aerial ultrasonic pulses which corresponds to a signal pulse for driving a piezoelectric element.

It is another object of this invention to provide a transmission system for aerial transmission of an ultrasonic pulse which corresponds at a ratio of 1:1 to a driving pulse by producing an ultrasonic pulse which increases in amplitude in one cycle of vibration of a thickness vibrating type piezoelectric element and subsequently, quickly attenuating.

It is still another object of this invention to provide a transmission unit capable of aerial transmission of the described ultrasonic pulse.

These and other objects of this invention will become more apparent from a description of a preferred embodiment given with reference to the accompanying drawings.

DETAILED DESCRIPTION OF THE INVENTION

Figure 3:
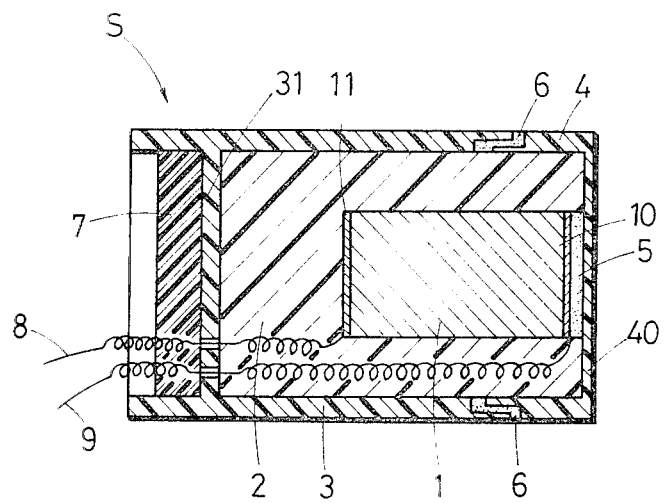
FIG. 3A is a sectional view of an embodiment of the transmitter of the invention.
FIG. 3B is a sectional view of an embodiment of the receiver of the invention.
Figure 3:
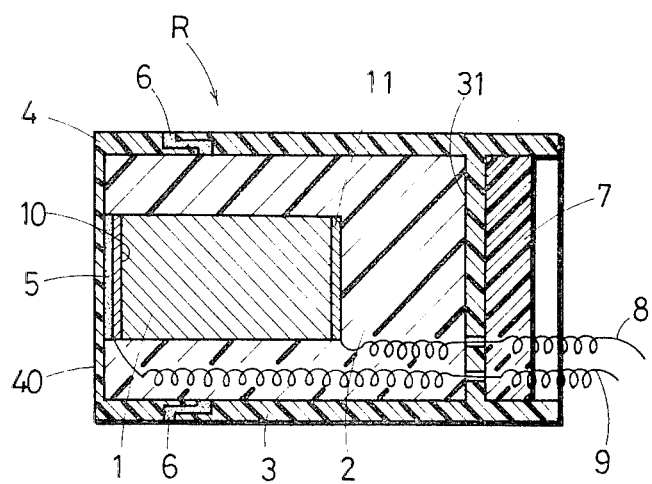
Figure 4:
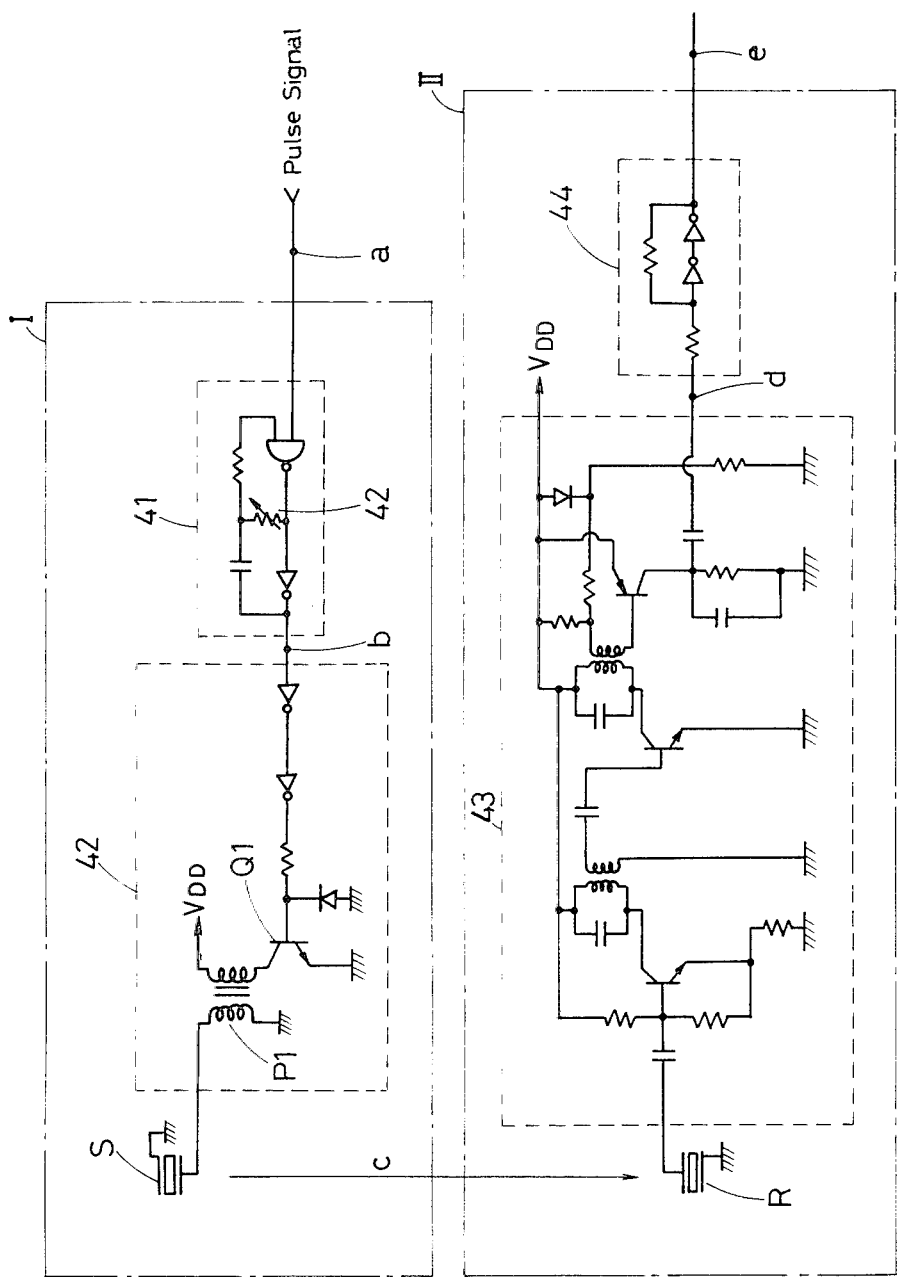
FIG. 4 is an electric circuit diagram for practicing the aerial ultrasonic transmission system of the invention.

Referring now to an ultrasonic pulse transmitter and receiver used in the system of the present invention, the transmitter and receiver are entirely the same in sectional structure and are disposed with their principal axes substantially in an opposed relation with each other on a straight line and accordingly, the transmitter alone is described to avoid repetition. In FIG. 3A, the transmitter is constructed by hermetically enclosing a thickness vibrating piezoelectric element 1 except the front end face portion thereof with a vibration absorbing member or a vibration damping member 2 and sleeving the vibration absorbing or damping member 2, except the front outer periphery thereof, into a casing 3 in a contacting relation therewith, putting a front cover 4 which has a front side protective film 40 excellent in sound transmissivity on the front outer periphery of the vibration absorbing member or vibration damping member 2, in the same manner as the cover 4, contacting the casing 3 and placing a vibration transmitting adhesive agent layer 5 between the front side protective film and the front end face of the piezoelectric element, and disposing a vibration damping adhesive agent layer 6 in the boundary between the casing 3 and the front cover 4. The numerals 8 and 9 designate respectively leads connected to an electrode 11 and an electrode 10. In the embodiment illustrated, the transmitter is provided in contact with the rear side member 31 with a vibration absorbing or vibration damping-sealing rear side finishing layer 7.

Referring now to each of the above component members, the thickness vibrating type piezoelectric element 1 is formed into a cylindrical shape of a well-known piezoelectric element, and is not particularly novel in material and shape. The vibration absorbing member or vibration damping member 2 is intended to mainly absorb or attenuate radial vibrations generated diametrically of the piezoelectric element 1 and thickness vibrations generated from the back side of the element 1 and to support the element 1. Polyurethane and other plastic foams or glass fibers and the like are used as a material for the member 2. The casing 3 is intended to supplementarily absorb those vibrations in the direction of diameter and thickness which could not be absorbed by the vibration absorbing or vibration damping member 2 and also to reinforce the member 2 mechanically and prevent external vibrations from being internally transmitted, and is made, for example, of polyacetal or other hard plastic resins. The front cover 4 covers the front side of the element 1 with the front side protective film 40 of the cover 4 so as to prevent internal invasion of dust and moisture and surrounds the exposed front outer periphery of the absorbing member 2 and functions in the same manner as the casing 3. The front side protective film 40 vibrates in resonance with thickness vibrations generated by the front side of the piezoelectric element 1, vibrates the air in front of the film 40 and facilitates generation of the thickness vibrations of the element 1. The material of the film 40 is preferably selected from polystyrene and other high-polymer-based soft plastics. A vibration transmitting adhesive agent layer 5 is intended to bond the element 1 to the film 40 so as to permit vibration, and is selected from vibration non-absorbment adhesive agents. The vibration damping adhesive agent layer 6 functions to provide a bond between the front cover 4 and the casing 3 and is intended to absorb vibrations so as to prevent so-called "reverberation and echo" from producing radiating vibrations. The reverberation and echo is a phenomenon which results from the vibrations which the vibration absorbing or damping member 2 failed to absorb spreading through the casing 3 and interfering in the thickness vibrations given by the front end face of the element 1. Accordingly, the layer 6 is essential for obtaining a narrow directional ultrasonic wave. The adhesive agent layer 6 shown is indicated in the form of a kind of stepped flange ring increasing stepwise in diameter in the direction of diameter of the element 1 and silicon rubber and other visco-elastic rubber-based adhesive agents are preferably used as a material for the layer 6. A rear side finishing layer 7 provides sufficient detergent for thickness vibrations from the rear side of the casing 3 in cooperation with a rear side member 31 of the casing 3 and serves also as a seal for leads 8 and 9. The material used for the finishing layer 7 is a bitumen material such as coal, tar or pitch. But this finishing layer 7 need not necessarily be used if vibration absorption or damping by the casing 3 is sufficient and the leads 8 and 9 are properly sealed. An ultrasonic wave receiver R is constructed in entirely the same manner as above, and therefore, the receiver R is designated by the same reference character as the transmitter S as shown in FIG. 3B.

Figure 1:
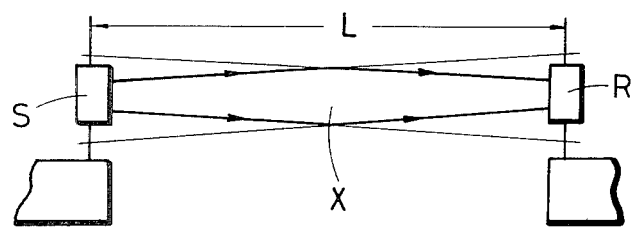
FIG. 1 is an explanatory view of an aerial ultrasonic pulse transmission system according to the invention.
Figure 2:
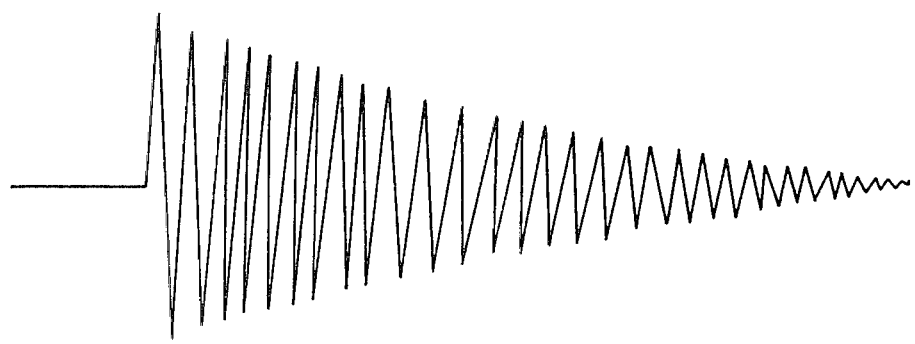
FIG. 2A is a diagram illustrating a type of ultrasonic pulse emitted by the conventional transmitter.
FIG. 2B is a diagram illustrating a type of ultrasonic pulse emitted by the transmitter of the invention.
Figure 2:
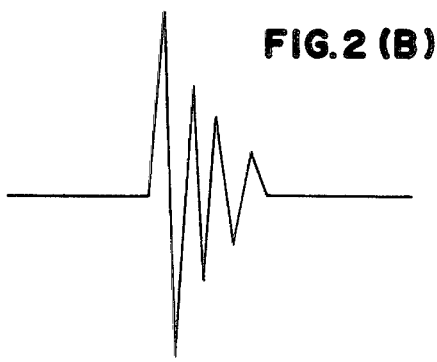
Figure 5:
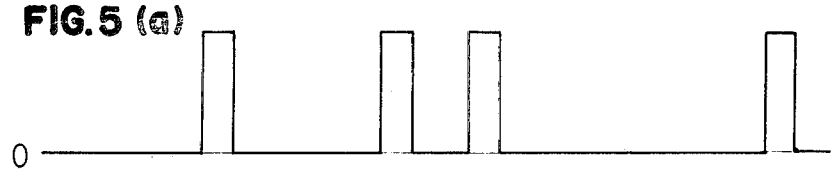
FIGS. 5(a) to 5(e) are operating waveform diagrams in the portions A-E of FIG. 4.
Figure 5:
Figure 5:
Figure 5:
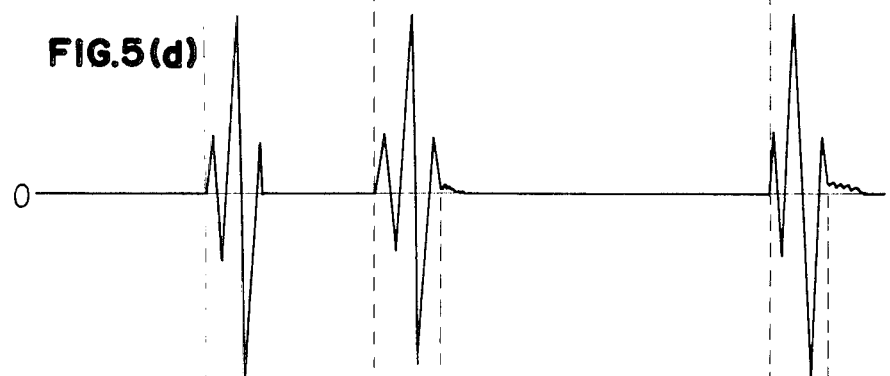
Figure 5:
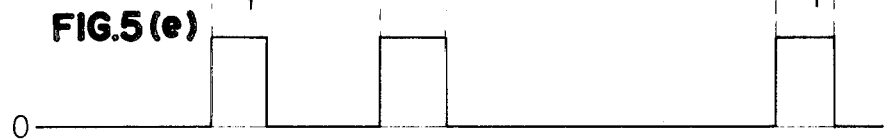

A description will now be given of a system of transmitting an aerial ultrasonic pulse. The transmitter and receiver constructed as above are disposed in an opposed relation with each other as shown in FIG. 1, and an ultrasonic pulse, as shown in FIG. 5C, is aerially transmitted between the transmitter and the receiver to transmit a signal in the air by bringing the received pulse shown in FIG. 5E in correspondence with the signal pulse shown in FIG. 5A in a ratio of substantially 1:1. The electric circuits for practicing the invention comprise a wave transmission circuit unit I consisting of an ultrasonic pulse drive circuit 42, a transmitter S, a wave receiving circuit unit II consisting of a receiver R, a received wave amplification-detecting circuit 43 and an amplified waveform shaping circuit 44. Referring to operation of each of the circuits, the ultrasonic pulse drive circuit 42 is intended to excite a piezoelectric element 1 by a signal pulse convertible into a driving pulse having a width necessary for exciting the element 1 by means of a multivibrator 41 and to aerially emit an ultrasonic pulse narrow in angle of direction from the transmitter S, and the multivibrator 41 is an astable multivibrator generating a pulse having a cycle determined by varying a resistor 42 by input of a signal pulse. In the invention, the signal pulse is determined in its oscillation cycle so that the signal pulse will become a single driving pulse optimum for exciting the piezoelectric element 1. The transmitter S is intended to transmit an ultrasonic pulse corresponding to the signal pulse in a ratio of substantially 1:1 to an opposed receiver R, and the receiver R is intended to receive the ultrasonic pulse. The received pulse amplification-detection circuit 43 is a circuit for amplifying and detecting the voltage received by the receiver R and produced by piezoelectric effect and is constructed to obtain a constant level amplitude by use of a logarithmic amplifier or AGC amplifier even if the distance L between the transmitter and the receiver is changed. An amplified waveform shaping circuit 44 intended to amplify the voltage corresponding to the envelope curve of the ultrasonic signal which has been amplified and detected by the received pulse amplification detection circuit 43 and to shape the waveform of the voltage into a rectangular pulse sets the voltage at a ratio of substantially 1:1 to the signal pulse inputted into the ultrasonic drive circuit 42.

A detailed description will now be given of the operating principle of the invention as to effectuation of aerial transmission of the ultrasonic pulse intended by the invention.

First, when a pulse signal (FIG. 5A) is inputted to the multivibrator 41, the multivibrator 41 converts the pulse signal into a driving signal (FIG. 5B) having an optimum width suitable for exciting a piezoelectric element 1 when the pulse signal was inputted. The driving pulse is fed to an ultrasonic pulse drive circuit 42 to energize a transistor Q1 and excite the element 1 through a pulse transformer P1 and generate an ultrasonic pulse excellent in damping characteristic shown in FIG. 5C. The ultrasonic pulse thus generated is received by the receiver R and is thereafter amplified by a received wave amplifying detector 43 and converted into a voltage having a waveform shown in FIG. 5C. The voltage corresponding in a ratio of 1:1 to the signal pulse detected by the received wave amplifying detector 43 is further shaped in waveform and detected as a rectangular received pulse (FIG. 5E). Accordingly, it will be understood that the signal pulse (FIG. 5A) is converted into an ultrasonic pulse (FIG. 5C) and that the resulting ultrasonic pulse can to be used for transmission of a signal in which the ultrasonic pulse corresponds to the received pulse (FIG. 5E) in a ratio of 1:1.

As apparent from the above description, the system of transmission of ultrasonic pulse according to the invention, provides a remarkable effect unattainable by the prior art aerial transmission systems.

(1) Because aerial transmission of the ultrasonic pulse has been rendered possible in industrial application, disposition of a transmitter and a receiver in an opposed relation with each other preferably with their principal axes brought into agreement, so long as there is no obstacle between the transmitter and the receiver, makes it possible to use aerial transmission of ultrasonic pulses of all kinds as a signal means such as for measurement, control, etc. in a comparatively short distance without being affected by the obstacles lying in the neighborhood of the transmitter and receiver.

(2) The system makes it possible to aerially transmit a high-fidelity ultrasonic pulse free from effect of external noises even while the transmitter and receiver are being moved. It will be understood that the use of a piezoelectric element excellent in mechanical Q in the transmitter and receiver provides a transmission system of aerial ultrasonic pulse excellent in selective characteristics and high in sensitivity. Furthermore, the transmitter and receiver provided by the invention produce the following marked effects.

(A) Industrial application of emission of ultrasonic pulse narrow in angle of direction and free from effect of external noise is rendered possible by a thickness vibrating type piezoelectric element of the transmitter.

(B) Excitation of one driving pulse of the thickness vibrating piezoelectric element enables industrial application of aerial emission of the ultrasonic pulse corresponding to the driving pulse in a ratio of substantially 1:1 and excellent in damping characteristic.

(C) The receiver, so long as it is the same in structure as the transmitter, is enabled to receive an ultrasonic pulse free from effect of external noise which the transmitter emits.

We claim:

1. A transmission system for aerial ultrasonic pulses comprising:
   an ultrasonic transmitter and an ultrasonic receiver in opposing relationship along a straight line, said transmitter and receiver each comprising:
      a thickness vibration type piezoelectric element having a front end face portion;
      a vibration absorbing material hermetically enclosing said piezoelectric element except said front end face portion;
      a casing enclosing said vibration absorbing material and having an open end which corresponds with said front end face portion of said piezoelectric element;
      a cover closing said open end of said casing, said cover comprising a protective film having excellent sound transmissivity;
      a vibration transmitting adhesive layer provided between said protective film and said front end face portion; and
      a vibration absorbing adhesive provided between a periphery of said cover and said casing;
   said transmitter and receiver being arranged such that said front end face portions of said transmitter and receiver face each other;
   whereby when said transmitter emits an ultrasonic pulse in response to a signal pulse, said receiver receives said ultrasonic pulse and converts said ultrasonic pulse to a voltage corresponding to said signal pulse.

2. An ultrasonic transmission unit according to claim 1, wherein the transmitter and receiver are provided in contact with said casing with a vibration absorbing sealing rear side finishing layer.

3. An ultrasonic transmission system according to claim 2, wherein said vibration absorbing material is made of a material selected from the group consisting of polyurethane foam and other soft plastic foam, sponge, and glass fibers, said casing is made of a material selected from the group consisting of polyacetal and other hard plastic resins, said cover is made of a material selected from the group consisting of polyethylene, polystyrene, and other high-polymer-based soft plastic resins, said vibration transmission adhesive is a hard adhesive agent having no vibration adhesibility, and said vibration absorbing adhesive is made of a material selected from the group consisting of silicon rubber and other visco-elastic rubber-based adhesive agents.

4. An ultrasonic transmission unit according to claims 2 or 3, wherein said rear side finishing layer is made from bitumen materials.

\* \* \* \* \*